US012674606B2

(12) United States Patent
Hu et al.

(10) Patent No.: US 12,674,606 B2
(45) Date of Patent: Jul. 7, 2026

(54) GAS-LIQUID SEPARATOR AND AIR CONDITIONING SYSTEM OF VEHICLE

(71) Applicants: Zhejiang Geely Holding Group Co., LTD., Zhejiang (CN); ZHEJIANG LIANKONG TECHNOLOGIES CO., LTD, Zhejiang (CN)

(72) Inventors: Lei Hu, Zhejiang (CN); Songyong Xia, Zhejiang (CN); Yehong Lu, Zhejiang (CN); Junyu Lu, Zhejiang (CN); Guanghua Zeng, Zhejiang (CN); Fengwei Yuan, Zhejiang (CN)

(73) Assignees: Zhejiang Geely Holding Group Co., LTD., Zhejiang (CN); ZHEJIANG LIANKONG TECHNOLOGIES CO., LTD, Zhejiang (CN)

( * ) Notice: Subject to any disclaimer, the term of this patent is extended or adjusted under 35 U.S.C. 154(b) by 214 days.

(21) Appl. No.: 18/619,183

(22) Filed: Mar. 28, 2024

(65) Prior Publication Data

US 2024/0230188 A1     Jul. 11, 2024

Related U.S. Application Data

(63) Continuation of application No. PCT/CN2022/100584, filed on Jun. 22, 2022.

(30) Foreign Application Priority Data

Sep. 29, 2021     (CN) ............................ 202111147621.9

(51) Int. Cl.
*F25B 43/00*          (2006.01)
*B01D 45/02*          (2006.01)
(52) U.S. Cl.
CPC ............ *F25B 43/006* (2013.01); *B01D 45/02* (2013.01); *F25B 2400/23* (2013.01)

(58) Field of Classification Search
CPC ................ F25B 43/006; F25B 2400/23; F25B 2400/03; F25B 2400/16; F25B 2400/162; B01D 45/02
See application file for complete search history.

(56) References Cited

U.S. PATENT DOCUMENTS

2007/0163296 A1 *    7/2007    Suzuki .................... F25B 9/008
                                                            62/512

FOREIGN PATENT DOCUMENTS

CN          2763760          3/2006
CN          103743170        4/2014
(Continued)

OTHER PUBLICATIONS

"Search Report of Europe Counterpart Application", issued on Dec. 16, 2024, p. 1-p. 6.
(Continued)

*Primary Examiner* — Miguel A Diaz
(74) *Attorney, Agent, or Firm* — JCIPRNET

(57) ABSTRACT

Provided are a gas-liquid separator and an air conditioning system of a vehicle. The gas-liquid separator includes: a housing having a liquid inlet, a liquid outlet, an air inlet and an air outlet; a middle cylinder arranged in the housing and provided with a separation recess, a first flow channel formed between an inner surface of the housing and an outer surface of the middle cylinder is configured to communicate the air inlet with the separation recess; an inner cylinder that is at least partially accommodated in the middle cylinder and forms a second flow channel together with an inner surface of the middle cylinder, the second flow channel being configured to communicate the separation recess with the air outlet; a third flow channel formed in the inner cylinder is configured to communicate the liquid inlet with the liquid outlet.

20 Claims, 12 Drawing Sheets

(56) References Cited

FOREIGN PATENT DOCUMENTS

| CN | 105241134 | 1/2016 |
| CN | 205516904 | 8/2016 |
| CN | 106196776 | 12/2016 |
| CN | 107763909 | 3/2018 |
| CN | 110319520 | 10/2019 |
| CN | 110857822 | 3/2020 |
| CN | 110857824 | 3/2020 |
| CN | 111365905 | 7/2020 |
| CN | 212378292 | 1/2021 |
| CN | 212378295 | 1/2021 |
| CN | 112432400 | 3/2021 |
| CN | 113291123 | 8/2021 |
| CN | 113739458 | 12/2021 |
| JP | H11190573 | 7/1999 |
| JP | 2019168215 | 10/2019 |
| KR | 20200137837 | 12/2020 |
| WO | 2017063613 | 4/2017 |

OTHER PUBLICATIONS

"International Search Report (Form PCT/ISA/210) of PCT/CN2022/100584," mailed on Sep. 9, 2022, with English translation thereof, pp. 1-8.

"Written Opinion of the International Searching Authority (Form PCT/ISA/237) of PCT/CN2022/100584," mailed on Sep. 9, 2022, with English translation thereof, pp. 1-9.

"Office Action of China Counterpart Application" with English translation thereof, issued on Jul. 26, 2022, p. 1-p. 14.

"Notice of Allowance of China Counterpart Application," with English translation thereof, issued on Dec. 5, 2022, p. 1-p. 3.

"Request for the Submission of an Opinion of Korea Counterpart Application", with English translation thereof, issued on Mar. 4, 2026, pp. 1-12.

* cited by examiner

GAS-LIQUID SEPARATOR AND AIR CONDITIONING SYSTEM OF VEHICLE

CROSS-REFERENCE TO RELATED APPLICATIONS

This application is a continuation of International Application No. PCT/CN2022/100584 filed on Jun. 22, 2022, which claims priority to Chinese Patent Application No. 202111147621.9, filed with China National Intellectual Property Administration on Sep. 29, 2021 and entitled "GAS-LIQUID SEPARATOR AND AIR CONDITIONING SYSTEM OF VEHICLE". The afore-mentioned patent applications are hereby incorporated by reference in their entireties.

TECHNICAL FIELD

The present application relates to the technical field of vehicles, and in particular, to a gas-liquid separator and an air conditioning system of a vehicle.

RELATED ART

Compared with ordinary internal combustion engine vehicles, electric vehicles have the characteristics of no use pollution, low noise and saving oil resources, and have become one of new generations of clean and environmentally friendly transportation tools. Compared with conventional fuel vehicles, which use the waste heat from the engine for heating, electric vehicles use batteries as driving power and use heat pump type air conditioning system for heating.

The air conditioning system of an electric vehicle of the related art includes a compressor, a condenser, an evaporator and a gas-liquid separator. The heat transfer medium circulates between the compressor, condenser, evaporator and gas-liquid separator to form a cooling cycle or a heating cycle. Among them, the gas-liquid separator is arranged between an outlet end of the evaporator and an inlet end of the compressor and used for separating a gaseous heat transfer medium and a liquid heat transfer medium to prevent the liquid heat transfer medium from entering the compressor.

However, the air conditioning system of the related art has a low energy efficiency ratio and high energy consumption, which affect the endurance of electric vehicles.

SUMMARY OF INVENTION

Technical Problem

Embodiments of the present application provide a gas-liquid separator and an air conditioning system of a vehicle to solve the problems of low energy efficiency ratio and high energy consumption, which affect the endurance of the electric vehicle, of the air conditioning system of the related art.

Solution to Problem

To achieve the above object, the present application provides the following technical solutions.

One aspect of embodiments of the present application provides a gas-liquid separator for an air conditioning system of a vehicle. The gas-liquid separator includes: a housing having a liquid inlet, a liquid outlet, an air inlet and an air outlet; a middle cylinder arranged in the housing and provided with a separation recess, where a first flow channel is formed between an inner surface of the housing and an outer surface of the middle cylinder, the first flow channel is configured to communicate the air inlet with the separation recess; an inner cylinder, which is at least partially accommodated in the middle cylinder, where a second flow channel is formed between an inner surface of the middle cylinder and an outer surface of the inner cylinder, the second flow channel is configured to communicate the separation recess and the air outlet, a third flow channel is formed in the inner cylinder, and the third flow channel is configured to communicate the liquid inlet with the liquid outlet.

Another aspect of the embodiments of the present application provides an air conditioning system for a vehicle, including a compressor, a condenser, an evaporator and the gas-liquid separator as described above, where the gas-liquid separator has a liquid inlet, a liquid outlet, an air inlet and an air outlet, and the liquid inlet is communicated with an outlet end of the condenser, the liquid outlet is communicated with an inlet end of the evaporator, and the air inlet is communicated with an outlet end of the evaporator, and the air outlet is communicated with an inlet end of the compressor.

Effects of Invention

The gas-liquid separator and the air conditioning system of the vehicle provided by the present application involve providing a third flow channel communicated between the outlet end of the condenser and the inlet end of the evaporator, and providing a first flow channel and a second flow channel that are communicated between the outlet end of the evaporator and the inlet end of the compressor, where the heat transfer medium in the third flow channel exchanges heat with the heat transfer medium in the second flow channel, and the heat transfer medium in the second flow channel exchanges heat with the heat transfer medium in the first flow channel, and when the heat transfer medium in the first flow channel enters the second flow channel through the separation recess, a liquid portion of the heat transfer medium will be stay along the wall of the middle cylinder, so that a gaseous portion and the liquid portion in the heat transfer medium are separated here, and the liquid portion of the heat transfer medium in the second flow channel will absorb the heat of the heat transfer medium in the third flow channel and evaporate, so as to improve a superheating degree and a suction dryness of the compressor, which is conducive to the separation of gas from liquid and the protection of the compressor. In addition, a temperature of the liquid in the third flow channel after the heat transfer and exchange is reduced to improve a supercooling degree, which is conducive to improving the cooling capacity, reducing the power consumption of the compressor for compressing heat transfer medium, and further improving the endurance of the electric vehicle.

In addition to the technical problems solved by the embodiments of the present application, the technical features constituting the technical solutions and the beneficial effects brought about by the technical features of these technical solutions as described above, other technical problems solved by the embodiments of the present application, other technical features contained in the technical solutions and the beneficial effects brought about by these technical features, will be further explained in detail in specific implementation modes.

BRIEF DESCRIPTION OF DRAWINGS

The drawings herein are incorporated into and form part of the description, show embodiments that comply with the present application, and are used together with the description to explain the principles of the present application.

Specific embodiments of the present application have been shown by the drawings above and will be described in more detail later. These drawings and textual descriptions are not intended in any way to limit the scope of the ideas of the present application, but rather to illustrate the concepts of the present application for those skilled in the art by reference to specific embodiments.

DESCRIPTION OF EMBODIMENTS

Figure 1:
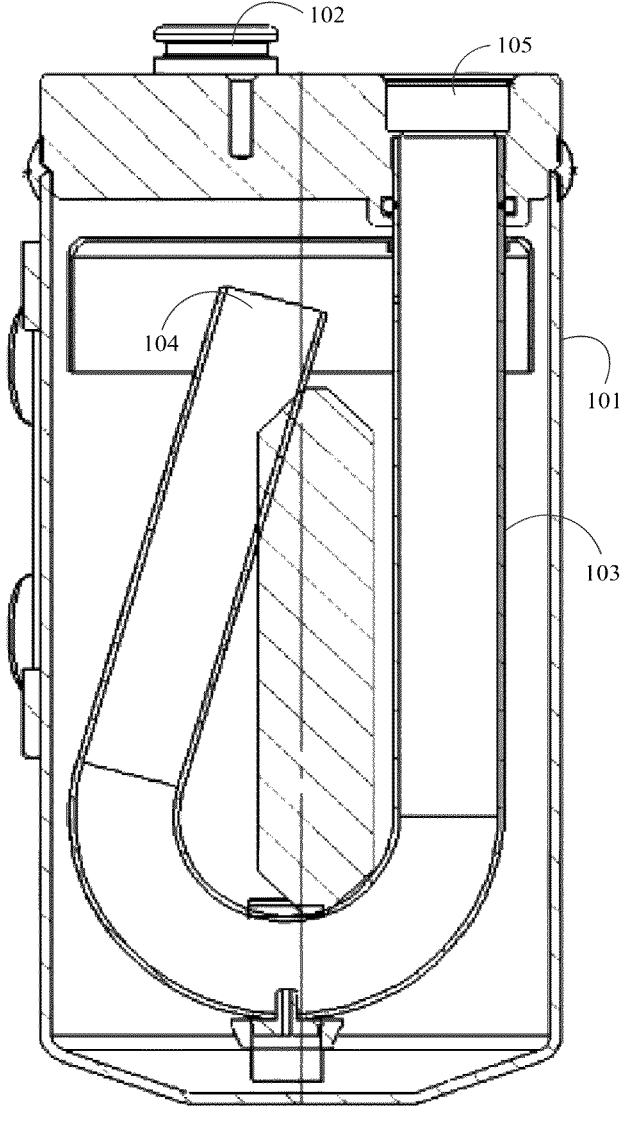
FIG. 1 is a gas-liquid separator of related art.

FIG. 1 shows a gas-liquid separator of the related art. As shown in FIG. 1, the gas-liquid separator of the related art includes a shell 101, and an accommodating space is formed in the shell 101. An upper end of the shell 101 is provided with an air inlet pipe 102 communicated with the accommodating space, and an air outlet pipe 103 is accommodated in the accommodating space. The air outlet pipe 103 is U-shaped, and both an air inlet end 104 and an air outlet end 105 of the air outlet pipe 103 are arranged upward, where a certain spacing is provided between the air inlet end 104 of the air outlet pipe 103 and a top wall of the shell 101, and the air outlet end 105 of the air outlet pipe 103 is arranged through the top wall. A mixture from an outlet end of the evaporator enters the accommodating space through the air inlet pipe 102. A liquid in the mixture in the accommodating space falls into the bottom of the accommodating space due to gravity and is deposited at the bottom of the accommodating space. A gas in the mixture in the accommodating space enters into the air outlet pipe 103 from the air inlet end 104 of the air outlet pipe 103 and exits from the air outlet end

105 of the air outlet pipe 103. A dry gas from the air outlet end 105 of the air outlet pipe 103 enters a compressor.

However, the compressor and a blower of the air conditioning system require a battery module of an electric vehicle to provide electrical energy, resulting in a large energy consumption of the electric vehicle when the air conditioning system is running, affecting the endurance of the electric vehicle. Taking cooling by air conditioning as an example, a cooling energy efficiency ratio of air conditioning refers to a ratio of rated cooling capacity to rated power consumption, that is, cold air generated by the consumption of unit electricity. It is known that increasing a supercooling degree of the condenser can improve the cooling capacity of the air conditioning and increase the cooling energy efficiency ratio of the air conditioning. The supercooling degree refers to a difference value between a temperature of condensate at a certain pressure and a saturation temperature at a corresponding pressure. In an air conditioning system, it refers to a difference value between a temperature of a heat transfer medium at the outlet end of the condenser (or an inlet end of a throttling apparatus located downstream of the condenser) and a temperature of the heat transfer medium in the condenser. It can be understood that the lower the temperature at the outlet end of the condenser, the greater the supercooling degree, and the higher the cooling energy efficiency ratio of the air conditioning.

In addition, according to the requirements of the working conditions of the compressor, the outlet end of the evaporator (or the inlet end of the compressor located downstream of the evaporator) needs to have a certain superheating degree to ensure the dryness of the heat transfer medium flowing into the compressor to protect the compressor. The superheating degree refers to a difference value between the temperature of superheated steam at a certain pressure and a saturation temperature at a corresponding pressure. In the air conditioning system, it refers to a difference value between the temperature of the heat transfer medium at the outlet end of the evaporator (the inlet end of the compressor) and the temperature of the heat transfer medium in the evaporator.

Understandably, the higher the temperature at the outlet end of the evaporator, the greater the superheating degree, the greater the dryness of the heat transfer medium flowing into the compressor, then the better to ensure the working conditions of the compressor. Exemplarily, the mixture flowing out of the evaporator contains 80% gaseous heat transfer medium and 20% liquid heat transfer medium. If the temperature of the heat transfer medium at the inlet end of the compressor is increased, the liquid heat transfer medium in the mixture may be evaporated by heat and converted into a gaseous heat transfer medium.

Since the heat transfer medium flowing out of the condenser is at normal temperature, the heat transfer medium flowing out of the evaporator is at low temperature, where the normal temperature, also known as room temperature, is generally in the range of 20-30° C., if the heat transfer medium at normal temperature is exchanged with the heat transfer medium at low temperature, it can meet the requirements of both the supercooling degree and a certain superheating degree. In other words, it can improve the cooling energy efficiency ratio of the air conditioning system and protect the compressor.

In view of this, the embodiments of the present application provide a first flow channel, a second flow channel and a third flow channel, the third flow channel being communicated between the outlet end of the condenser and the inlet end of the throttling apparatus, and the first flow channel and the second flow channel being communicated between the outlet end of the evaporator and the inlet end of the compressor.

Among them, the applicant finds that the heat transfer medium at normal temperature flowing out of the condenser is mostly liquid heat transfer medium, while the heat transfer medium at low temperature flowing out of the evaporator is mostly gaseous heat transfer medium. And the gaseous heat transfer medium is easier to flow in the pipe than the liquid heat transfer medium. In other words, a length of flow path of the gaseous heat transfer medium is greater than that of the liquid heat transfer medium per unit time. Therefore, in the embodiments of the present application, the first flow channel is set as U shape, the second flow channel is also set as U shape, and the second flow channel is arranged around the outside of the third flow channel, and the first flow channel is arranged around the outside of the second flow channel, so as to increase the heat exchange efficiency between the liquid heat transfer medium in the third flow channel and the gaseous heat transfer medium in the second flow channel by increasing the heat transfer area. And the first flow channel and the second flow channel are communicated through a separation recess, and a liquid portion of the heat transfer medium and a gaseous portion of the heat transfer medium are separated at the separation recess, so as to achieve the gas-liquid separation effect of the heat transfer medium.

In order to make the purpose, technical solution and advantages of the embodiments of the present application more clear, the technical solutions in the embodiments of the present application will be clearly and completely described in combination with the drawings in the embodiments of the present application. Obviously, the embodiments described are part of the embodiments of the present application, but not all embodiments.

Figure 2:
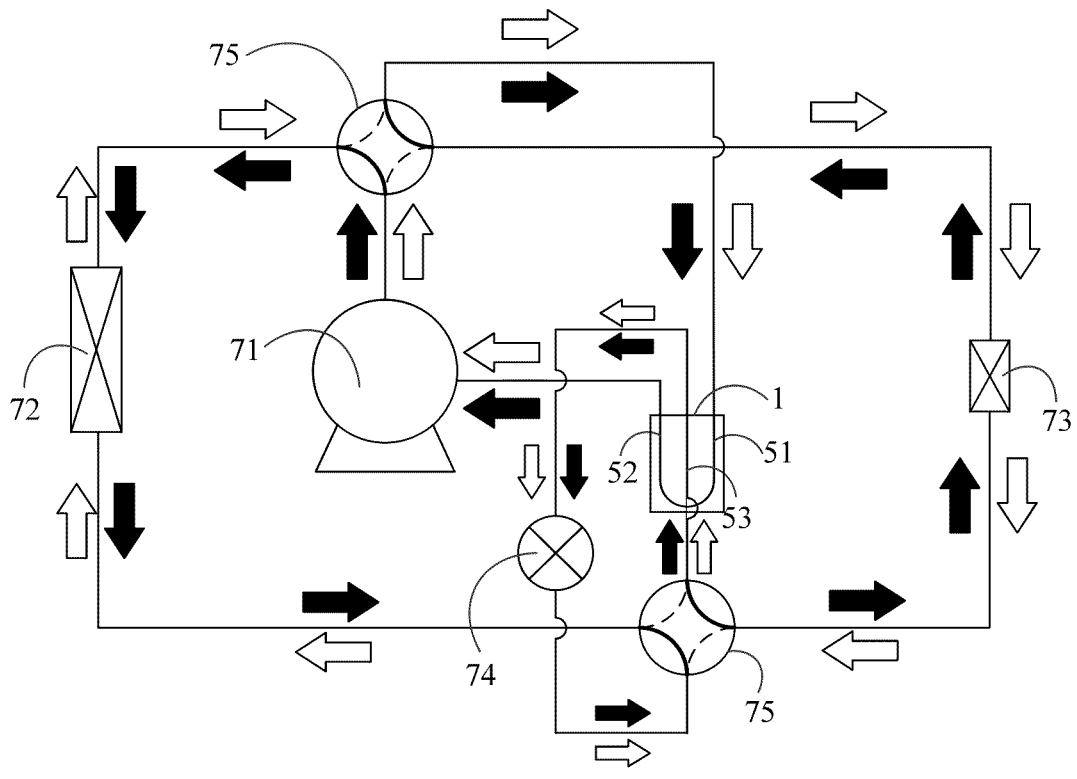
FIG. 2 is a flowing diagram of a heat transfer medium of an air conditioning system provided by an embodiment of the present application.

Firstly, the gas-liquid separator provided by the embodiments of the present application can be applied not only in an air conditioning system with a single cooling cycle, but also in an air conditioning system with a cooling and heating double cycle. FIG. 2 is a flow diagram of a heat transfer medium of an air conditioning system provided by an embodiment of the present application. FIG. 2 shows an application of a gas-liquid separator 1 in a cooling-and-heating cycle air conditioning system as an example. For the applications of gas-liquid separator 1 in single cooling cycle and other cooling-and-heating double cycle air conditioning system, they can be simply derived, and will not be repeated here.

Referring to FIG. 2, the air conditioning system includes a compressor 71, a reversing valve 75, an internal heat exchanger 73, an external heat exchanger 72, and a gas-liquid separator 1. The internal heat exchanger 73 is used in a heat exchanger for heat exchange with the air inside the vehicle. The external heat exchanger 72 is used in a heat exchanger for heat exchange with the air outside the vehicle. In a cooling cycle, the internal heat exchanger 73 is an evaporator to reduce the air temperature in the vehicle. The external heat exchanger 72 is a condenser to transfer heat to air outside the vehicle. In the heating cycle, the internal heat exchanger 73 is a condenser to raise the indoor air. The external heat exchanger 72 is an evaporator to absorb the heat from the air outside the vehicle.

The solid arrows in FIG. 2 represent the cooling cycle of the air conditioning system. Referring to FIG. 2, the flow path of heat transfer medium in cooling cycle is as follows: low-temperature and low-pressure gaseous heat transfer medium changes into high-temperature and high-pressure gaseous heat transfer medium through the compressor 71→the high-temperature and high-pressure gaseous heat transfer medium flows into the external heat exchanger 72 through the reversing valve 75, and changes into normal-temperature and high-pressure liquid heat transfer medium through the external heat exchanger 72→the normal-temperature and high-pressure liquid heat transfer medium flows into the third flow channel 53 of the gas-liquid separator 1 through the reversing valve 75 to reduce the temperature of the liquid heat transfer medium→the temperature-reduced liquid heat transfer medium changes into a low-pressure liquid heat transfer medium through the throttling apparatus 74→the low-pressure liquid heat transfer medium flows into the internal heat exchanger 73 through the reversing valve 75 and changes into low-temperature and low-pressure gaseous heat transfer medium through the internal heat exchanger 73→the low-temperature and low-pressure gaseous heat transfer medium flows into the first flow channel 51 and the second flow channel 52 of the gas-liquid separator 1 through the reversing valve 75 to increase the temperature of the gaseous heat transfer medium→the temperature-increased gaseous heat transfer medium flows into the compressor 71 again, and then the cycle continues as such.

The hollow arrows in FIG. 2 represent the cooling cycle of the air conditioning system. Referring to FIG. 2, the flow path of heat transfer medium in cooling cycle is as follows: the low-temperature and low-pressure gaseous heat transfer medium changes into the high-temperature and high-pressure gaseous heat transfer medium through the compressor 71→the high-temperature and high-pressure gaseous heat transfer medium flows into the internal heat exchanger 73 through the reversing valve 75, and changes into normal-temperature and high-pressure liquid heat transfer medium through the internal heat exchanger 73→the normal-temperature and high-pressure liquid heat transfer medium flows into the third flow channel 53 of the gas-liquid separator 1 through the reversing valve 75 to reduce the temperature of the liquid heat transfer medium→the temperature-reduced liquid heat transfer medium changes into a low-pressure liquid heat transfer medium through the throttling apparatus 74→the low-pressure liquid heat transfer medium flows into the external heat exchanger 72 through the reversing valve 75, and changes into low-temperature and low-pressure gaseous heat transfer medium through the external heat exchanger 72→the low-temperature and low-pressure gaseous heat transfer medium flows into the first flow channel 51 and the second flow channel 52 of the gas-liquid separator 1 through the reversing valve 75 to increase the temperature of the gaseous heat transfer medium→the temperature-increased gaseous heat transfer medium flows into the compressor 71 again, and then the cycle continues as such.

It should be noted that the liquid heat transfer medium and gaseous heat transfer medium mentioned in the above paragraph only represent the state of most of the heat transfer medium in the process. For example, in the cooling cycle, a majority of the heat transfer medium flowing from the internal heat exchanger 73 is the gaseous heat transfer medium, and a small part of them is the liquid heat transfer medium. In the heating cycle, a majority of the heat transfer medium flowing from the external heat exchanger 72 is the gaseous heat transfer medium, and a small part thereof is the liquid heat transfer medium. The liquid heat transfer medium of the heat transfer medium flowing from the internal heat exchanger 73 in the cooling cycle can be removed by the gas-liquid separator 1 provided by the embodiments of the present application, or the liquid heat transfer medium of the heat transfer medium flowing from the external heat exchanger 72 in a heating cycle can be removed by the gas-liquid separator 1 provided by the embodiments of the present application to ensure the dryness of the heat transfer medium flowing into the compressor 71.

Figure 3:
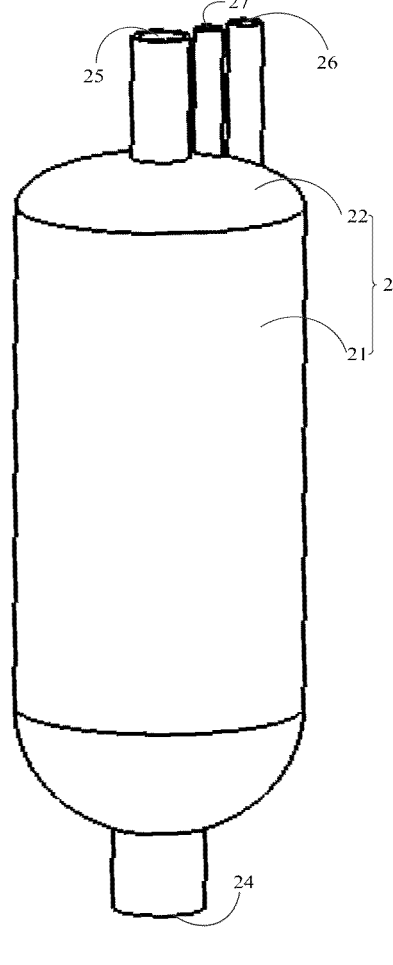
FIG. 3 is a stereoscopic diagram of a gas-liquid separator provided by an embodiment of the present application.
Figure 4:
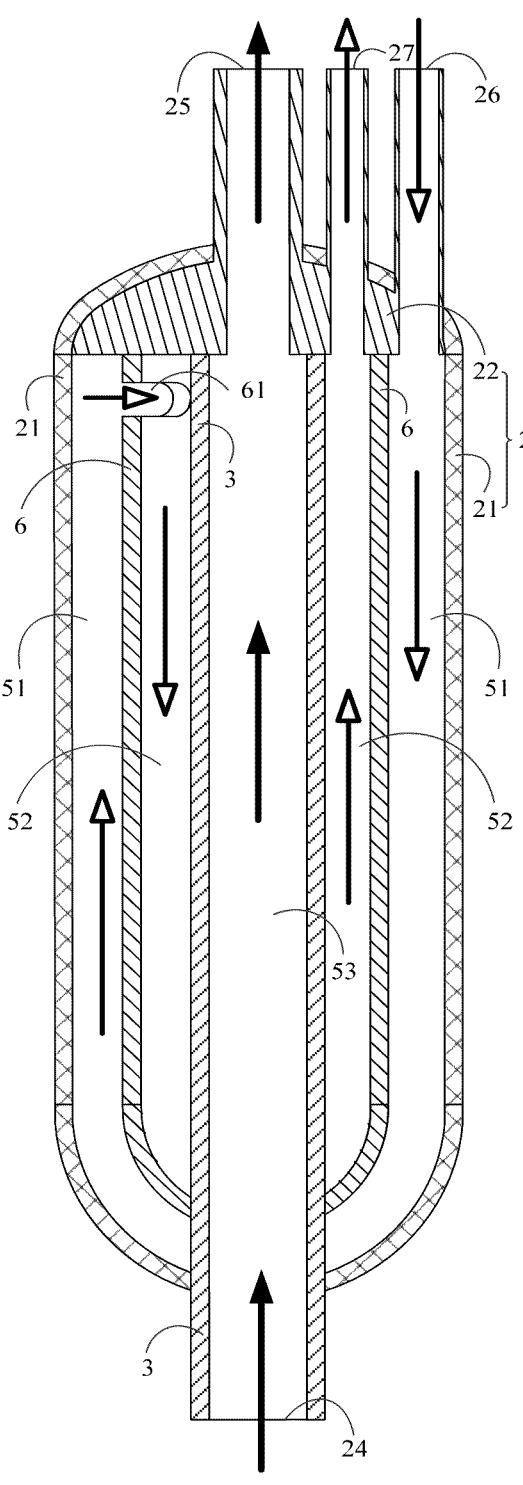
FIG. 4 is a longitudinal section view along one direction of the gas-liquid separator shown in FIG. 3.

FIG. 3 is a stereoscopic view of a gas-liquid separator provided by an embodiment of the present application, and FIG. 4 is a longitudinal section view along one direction of the gas-liquid separator shown in FIG. 3. Referring to FIG. 3 and FIG. 4, the gas-liquid separator includes a housing 2, a middle cylinder 6, and an inner cylinder 3. The housing 2 is provided with a liquid inlet 24, a liquid outlet 25, an air inlet 26 and an air outlet 27.

The middle cylinder 6 is arranged in the housing 2 and is provided with a separation recess 61. A first flow channel 51 is formed between an inner surface of the housing 2 and an outer surface of the middle cylinder 6, and the first flow channel 51 is configured to communicate the air inlet 26 with the separation recess 61. At least part of the inner cylinder 3 is accommodated in the middle cylinder 6. That is, the inner cylinder 3 is arranged through the housing 2.

A second flow channel 52 is formed between an inner surface of the middle cylinder 6 and an outer surface of the inner cylinder 3, and the second flow channel 52 is configured to communicate the separation recess 61 and the air outlet 27. A third flow channel 53 is formed in the inner cylinder 3, and the third flow channel 53 is communicated with the liquid inlet 24 and the liquid outlet 25.

Specifically, the middle cylinder 6 can be fully accommodated in the housing 2, and there is a spacing between the outer surface of the middle cylinder 6 and an inner surface of the shell 101, for flowing of the heat transfer medium, and the spacing can form the first flow channel 51. In order to facilitate the flow of the heat transfer medium, the middle cylinder 6 can be arranged coaxially with the housing 2. Continuing as shown in FIG. 4, a part of the inner cylinder 3 can be arranged in the middle cylinder 6, and there can be a certain spacing between the outer surface of the part of the inner cylinder 3 and the inner surface of the middle cylinder 6, and the spacing can form the second flow channel. The middle cylinder 6 can be provided with the separation recess 61, and the separation recess 61 can communicate the first flow channel and the second flow channel. In addition, due to different specific gravity of the liquid heat transfer medium and the gaseous heat transfer medium, when the heat transfer medium passes through the separation recess 61, the liquid heat transfer medium is subjected to a larger gravity action, and the liquid heat transfer medium has a relatively large viscosity, so the liquid heat transfer medium will be attached to the wall of the middle cylinder 6 and flow down. While the gaseous heat transfer medium will flow in the second flow channel 52 and flow out of the housing 2 through the air outlet 27. In this way, the liquid portion of the heat transfer medium is separated from the gaseous portion.

The solid arrows in FIG. 4 represent a normal temperature heat transfer medium. Referring to FIG. 4, a third flow channel 53 is formed in the inner cylinder 3, and two ends of the third flow channel 53 are communicated with the liquid inlet 24 and the liquid outlet 25 respectively. The upstream of the liquid inlet 24 can be communicated with the outlet end of the condenser mentioned above, and the downstream of the liquid outlet 25 can be communicated with the inlet end of the throttling apparatus mentioned above. The third flow channel 53 formed by the inner cylinder 3 is arranged between the condenser and the throttling apparatus, and the heat transfer medium flowing in the third flow channel 53 is normal temperature heat transfer medium.

The hollow arrows in FIG. 4 represent the flow path of a low-temperature heat transfer medium. Referring to FIG. 4, the first flow channel 51 is communicated with the air inlet 26, the first flow channel 51 is communicated with the second flow channel 52 through the separation recess 61, and the second flow channel 52 is communicated with the air outlet 27. The upstream of the air inlet 26 can be communicated with the outlet end of the evaporator mentioned above, and the downstream of the air outlet 27 can be communicated with the inlet end of the compressor mentioned above. Both the first flow channel 51 and the second flow channel 52 are arranged between the evaporator and the compressor, a relatively low-temperature heat transfer medium flow in the first flow channel 51 and the second flow channel 52. The relatively low-temperature heat transfer medium in the second flow channel 52 exchange heat with the normal temperature heat transfer medium in the third flow channel 53 to improve the dryness of the heat transfer medium in the second flow channel 52.

Continuing with FIG. 4, the housing 2 can include an outer cylinder 21 and a cover plate 22 in order to facilitate installations among the inner cylinder 3, the middle cylinder 6 and the housing 2. The outer cylinder 21 and the middle cylinder 6 can have an open end on the same side and a closed end on the same side, and the cover plate 22 can be configured to cover the open end of the outer cylinder 21 and the open end of the middle cylinder 6. Both the air inlet 26 and the air outlet 27 can be arranged on the cover plate 22. The outer cylinder 21, the middle cylinder 6 and the cover plate 22 between the outer cylinder 21 and the middle cylinder 6 can be enclosed together to form the first flow channel 51, and the middle cylinder 6, the inner cylinder 3 and the cover plate 22 between the middle cylinder 6 and the inner cylinder 3 can be enclosed together to form the second flow channel 52.

Specifically, the outer cylinder 21 can include an open end and a closed end. The middle cylinder 6 can also include an open end and a closed end. The open end of the outer cylinder 21 and the open end of the middle cylinder 6 can face the same direction. FIG. 4 shows an example where both the open end of the outer cylinder 21 and the open end of the middle cylinder 6 face upward. In addition, the cover plate 22 can be abutted against and fixed together with an end face of the open end of the outer cylinder 21, and the cover plate 22 and the outer cylinder 21 can form an accommodating space. The middle cylinder 6 can be accommodated in the accommodating space, and an end face of the open end of the middle cylinder 6 is abutted against and fixed together with the cover plate 22, so that the cover plate 22 and the middle cylinder 6 also form a containment space. In other words, the middle cylinder 6 can divide the accommodating space into the first flow channel 51 and the containment space.

In addition, the closed end of the outer cylinder 21 and the closed end of the middle cylinder 6 can be arranged towards the same direction. FIG. 4 shows an example where both the closed end of outer cylinder 21 and the closed end of middle cylinder 6 face downward. In order to collect and export the liquid heat transfer medium in the first flow channel 51 and the second flow channel 52, the inner surface of the closed end of the outer cylinder 21 and the inner surface of the closed end of the middle cylinder 6 can be set into an arc shape.

It should be noted that in addition to being arranged on the cover plate 22 as shown in FIG. 4, the air inlet 26 can be arranged on a side wall of the outer cylinder 21. The air let 26 can be arranged on upper part, middle part or lower part of the side wall of the outer cylinder 21.

In addition, the inner cylinder 3 can have a first open end and a second open end. Since the inner cylinder 3 is partially accommodated in the containment space, in order to make the first open end communicate with the liquid inlet 24 and the second open end communicate with the liquid outlet 25, the inner cylinder 3 can be arranged in the following ways.

In one possible implementation, referring to FIG. 4, the first open end and the second open end can be respectively arranged on two opposite sides of the inner cylinder 3, and the first open end can be sequentially arranged through the closed end of the middle cylinder 6 and the closed end of the outer cylinder 21, and is communicated with the liquid inlet 24. The second open end can be arranged on the same side as the open end of the outer cylinder 21 and be covered by the cover plate 22.

Specifically, the open end of the outer cylinder 21, the open end of the middle cylinder 6, and the first open end of the inner cylinder 3 can all be arranged towards the first side. The cover plate 22 can be arranged on the first side of the outer cylinder 21 and configured to cover the open end of the outer cylinder 21, the open end of the middle cylinder 6, and the first open end of the inner cylinder 3. The cover plate 22 located between the outer cylinder 21 and the middle cylinder 6 can have the air inlet 26, and the cover plate 22 located between the middle cylinder 6 and the inner cylinder 3 can have the air outlet 27. The closed end of the outer cylinder 21, the closed end of the middle cylinder 6, and the second open end of the inner cylinder 3 can all be arranged towards the second side. FIG. 4 shows an example of coaxial setting of the inner cylinder 3 and the middle cylinder 6. The axis of the inner cylinder 3 can be a straight line as shown in FIG. 4, or the axis of the inner cylinder 3 can also be a curve having one or more inflection points and provided along a length direction of the middle cylinder 6 in order to extend the path of the heat transfer medium flowing in the inner cylinder 3.

Figure 8:
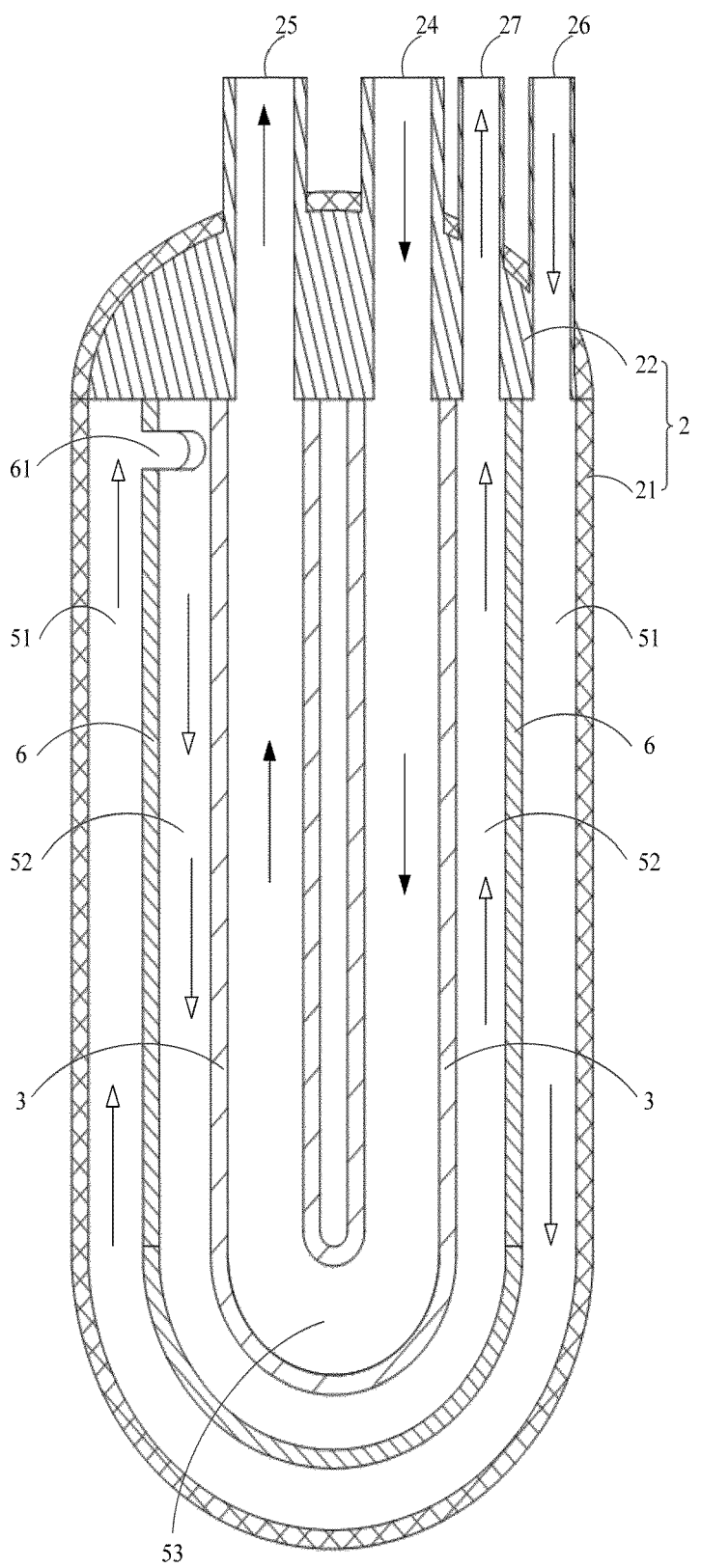
FIG. 8 is a longitudinal section view along one direction of another gas-liquid separator provided by an embodiment of the present application.

In another possible implementation, referring to FIG. 8, the first open end and the second open end are arranged on the same side as the open end of the outer cylinder 21. The first open end and the second open end are covered by the cover plate 22. The liquid inlet 24 and liquid outlet 25 are arranged on the cover plate 22.

Specifically, the open end of the outer cylinder 21, the open end of the middle cylinder 6, the first open end of the inner cylinder 3, and the second open end of the inner cylinder 3 can all be arranged towards the first side. The cover plate 22 can be arranged on the first side of the outer cylinder 21 and configured to cover the open end of the outer cylinder 21, the open end of the middle cylinder 6, the first open end of the inner cylinder 3, and the second open end of the inner cylinder 3. FIG. 8 shows an example of the inner cylinder 3 being a U-shaped pipe. Of course, the axis of the inner cylinder 3 can be U-shaped as shown in FIG. 8, or the axis of the inner cylinder 3 can also be a curve having one or more inflection points and provided along a width direction of the middle cylinder 6.

In order to improve the heat exchange efficiency between the heat transfer medium in the second flow channel 52 and the heat transfer medium in the first flow channel 51. The first flow channel 51 can be arranged in a U shape to increase the contact area between the two so as to improve efficiency.

10

Figure 5:
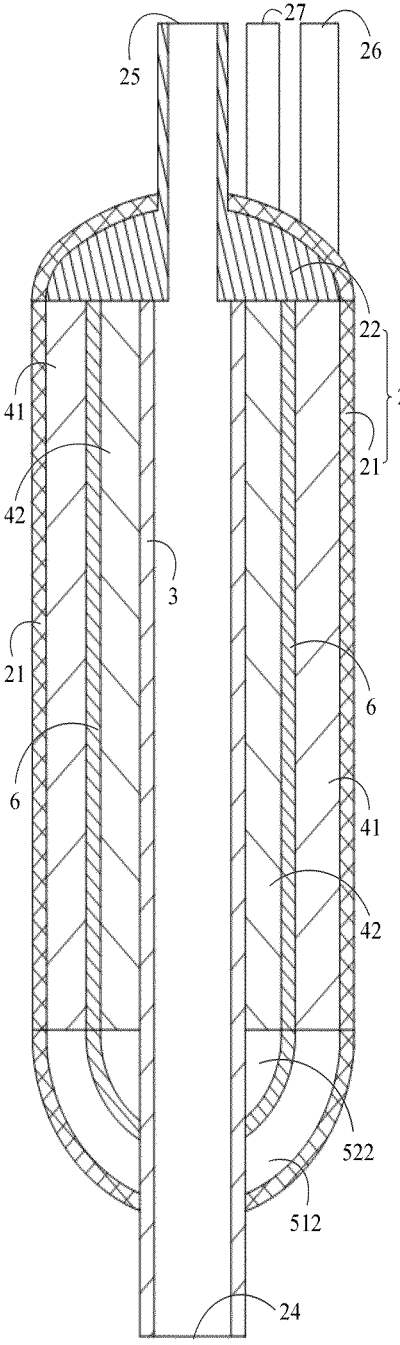
FIG. 5 is a longitudinal section view along another direction of the gas-liquid separator shown in FIG. 3.
Figure 6:
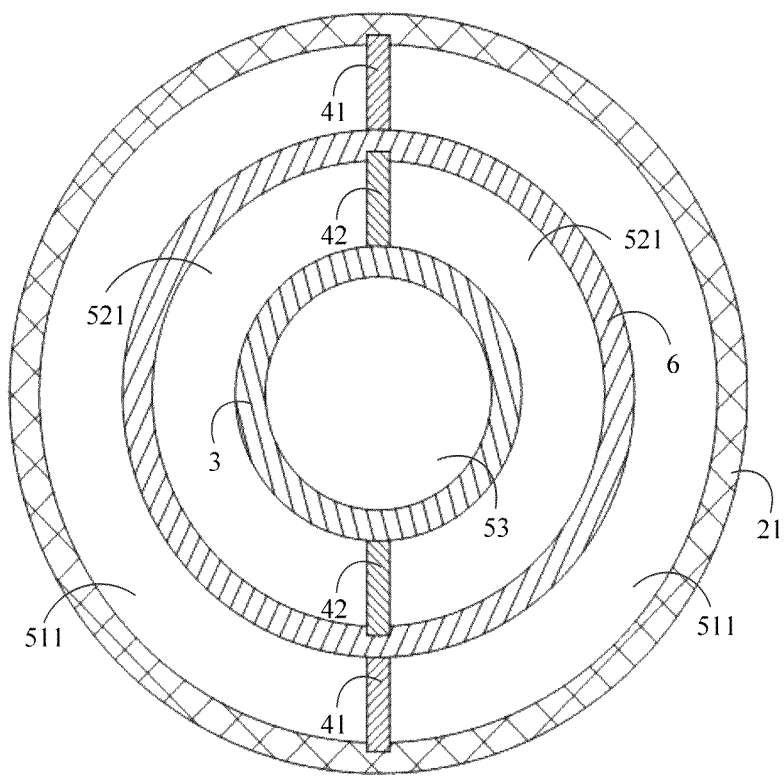
FIG. 6 is a transversal section view of the gas-liquid separator shown in FIG. 3 at a position provided with a baffle.
Figure 7:
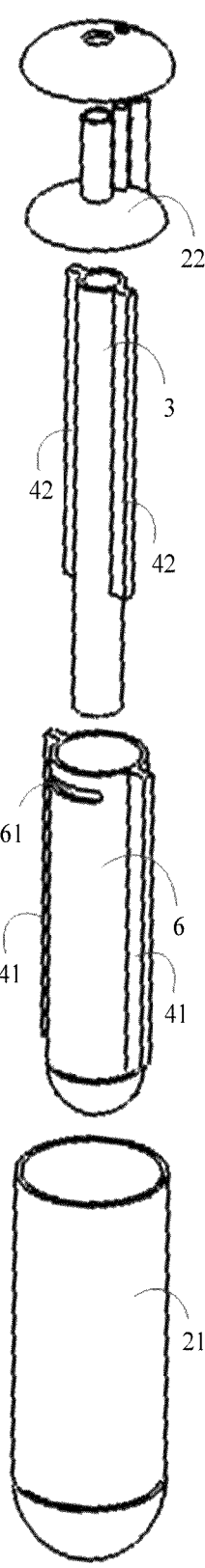
FIG. 7 is an exploded diagram of the gas-liquid separator shown in FIG. 3.
Figure 9:
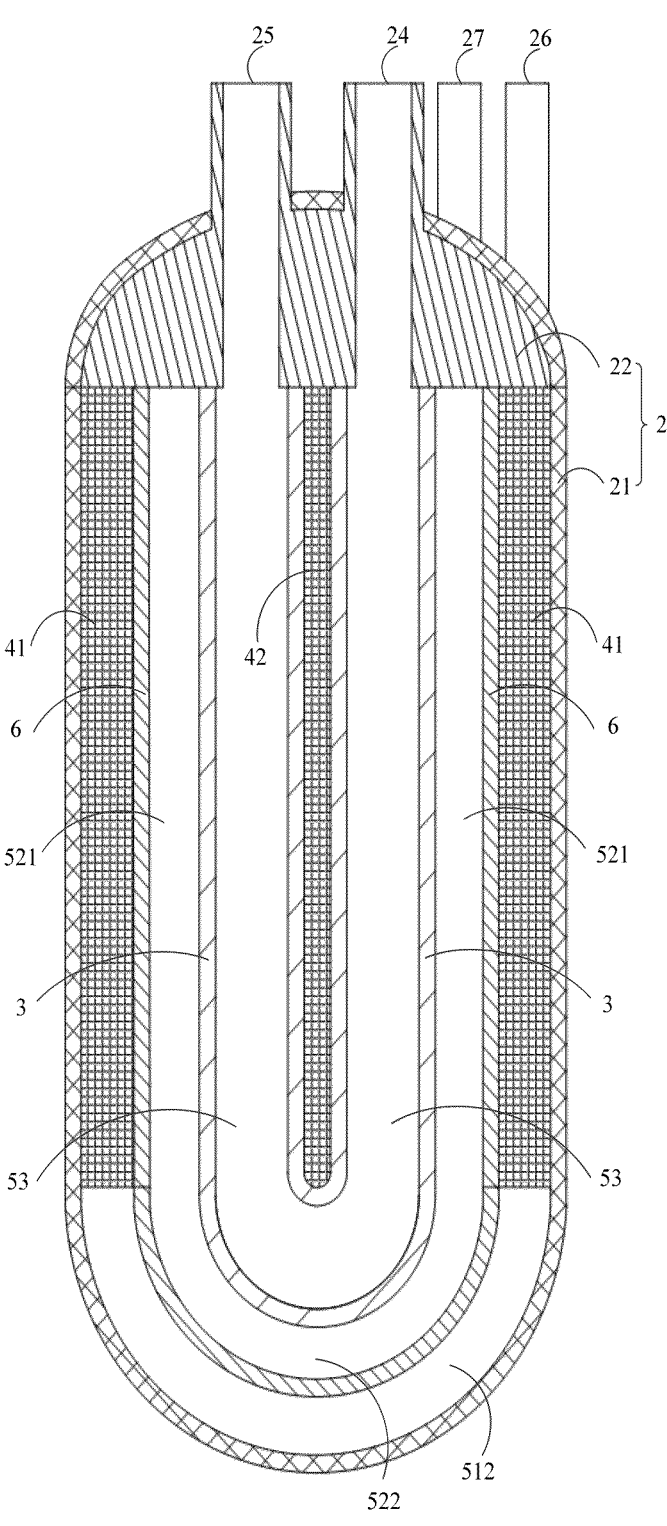
FIG. 9 is a longitudinal section view along another direction of the gas-liquid separator shown in FIG. 8.
Figure 10:
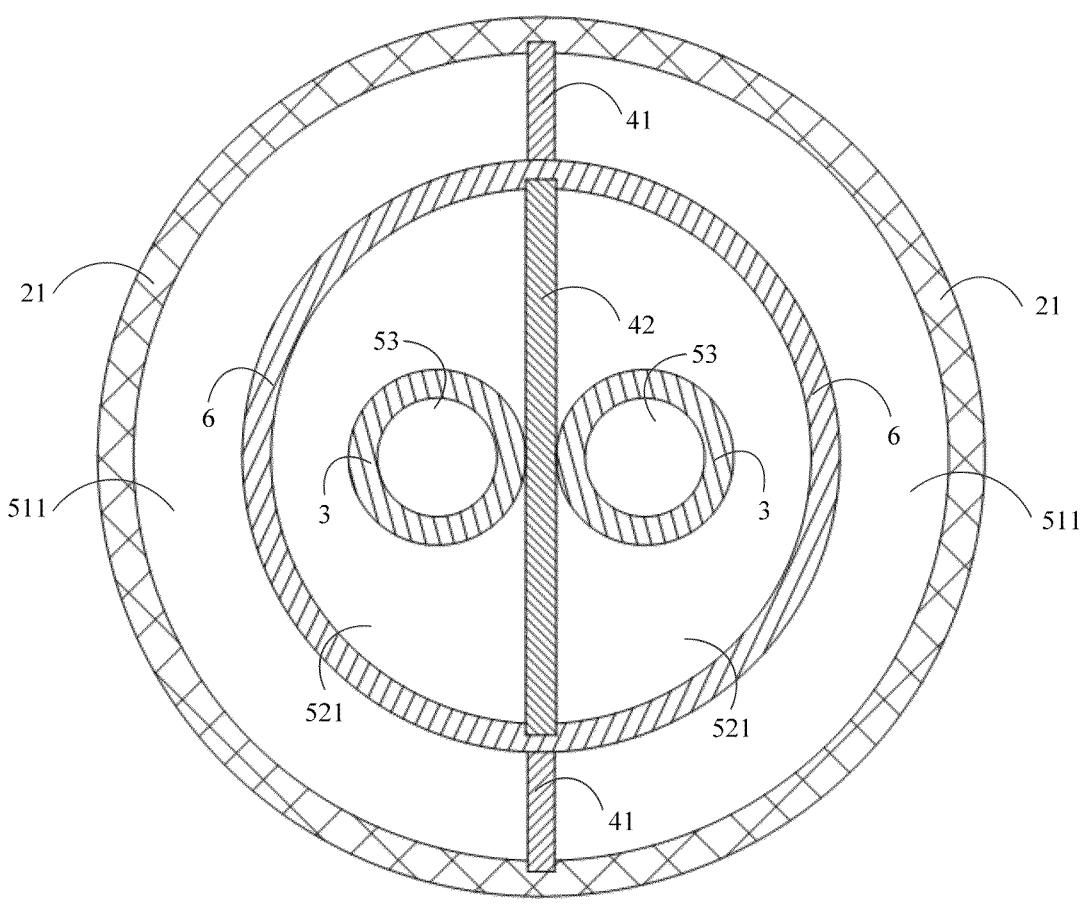
FIG. 10 is a transversal section view of the gas-liquid separator shown in FIG. 8.

FIG. 5 is a longitudinal section view along another direction of the gas-liquid separator shown in FIG. 3, FIG. 6 is a transversal section view of the gas-liquid separator as shown in FIG. 3 at a position provided with a baffle; FIG. 7 is an exploded diagram of the gas-liquid separator shown in FIG. 3. FIG. 9 is a longitudinal section view along another direction of the gas-liquid separator shown in FIG. 8, and FIG. 10 is a transversal section view of the gas-liquid separator shown in FIG. 8. Referring to FIGS. 3-7 and FIGS. 8-10, in an embodiment, a first baffle 41 can be arranged between the outer cylinder 21 and the middle cylinder 6. The first baffle 41 can be accommodated at an upper part of the first flow channel 51 and can be configured to divide the upper part of the first flow channel 51 into two first areas 511. The air inlet 26 and the separation recess 61 can be communicated with the two first areas 511 respectively, and the undersides of the two first areas 511 can be intercommunicated.

Specifically, the first flow channel 51 can include an upper part accommodating the first baffle 41 and a lower part without the first baffle 41. In a length direction, a first end of the first baffle 41 can be flush with the end face of the open end of the middle cylinder 6 and abuts against the surface of the cover plate 22. There is a certain spacing between a second end of the first baffle 41 and the inner surface of the closed end of the outer cylinder 21, forming a first communication area 512 as shown in FIG. 5 or FIG. 9. In a width direction, the first side of the first baffle 41 is fixed to the outer surface of the middle cylinder 6, and the second side of the first baffle 41 is fixed to the inner surface of the outer cylinder 21 so that the upper part of the first flow channel 51 is divided by the first baffle 41 into two first areas 511 as shown in FIG. 6 or FIG. 10. The undersides of the two first areas 511 are intercommunicated through the first communication area 512. Thus, the first flow channel 51 is U-shaped.

In order to facilitate the installation of the first baffle 41, referring to FIGS. 6, 7 and 10, the inner wall of the outer cylinder 21 can be provided with a first groove. The first baffle 41 can be fixed to an outer wall of the middle cylinder 6 and extends towards an outer side of the middle cylinder 6, and is embedded in the first groove. When installing the first baffle 41, the first baffle 41 can be fixed to the middle cylinder 6, and then the first baffle 41 can slide in the first groove to determine a position of the first baffle 41 with respect to the outer cylinder 21. Finally, the first baffle 41 is fixed to the outer cylinder 21 by injecting a solder into the first groove.

According to FIGS. 4-6 and FIGS. 8-10, the heat transfer medium entered from the air inlet 26 first passes through the first area 511 on one side of the middle cylinder 6, and then passes through the first communication area 512 to reach the first area 511 on the other side of the middle cylinder 6, and enters into the second flow channel 52 through the separation recess 61.

Similarly, in order to improve the heat exchange efficiency between the heat transfer medium in the third flow channel 53 and the heat transfer medium in the second flow channel 52, the second flow channel 52 can be set into a U-shape to improve the efficiency by increasing the contact area of the two.

Continue to referring to FIGS. 3-7 and FIGS. 8-10, a second baffle 42 can be arranged between the middle cylinder 6 and the inner cylinder 3. The second baffle 42 can be accommodated at an upper part of the second flow channel 52 and is configured to divide the upper part of the second flow channel 52 into two second areas 521. The separation recess 61 and the air outlet 27 can communicate with the two second areas 521 respectively. And the undersides of the two second areas 521 are intercommunicated.

Specifically, the second flow channel 52 can include the upper part accommodating the second baffle 42 and a lower part without the second baffle 42. In a length direction, a first end of the second baffle 42 can be flush with the end face of the open end of the inner cylinder 3 and abuts against the surface of the cover plate 22. There is a certain spacing between a second end of the second baffle 42 and the inner surface of the closed end of the middle cylinder 6, forming a second communication area 522 as shown in FIG. 5 or FIG. 9. In a width direction, the first side of the second baffle 42 is fixed to the outer surface of the inner cylinder 3, and the second side of the second baffle 42 is fixed to the inner surface of the middle cylinder 6 so that the upper part of the second flow channel 52 is divided by the second baffle 42 into two second areas 521 as shown in FIG. 6 or FIG. 10. The undersides of the two second areas 521 are intercommunication through the second communication area 522. Thus, the second flow channel 52 is U-shaped.

In order to facilitate the installation of the second baffle 42, referring to FIGS. 6, 7 and 10, the inner wall of the middle cylinder 6 can be provided with a second groove. The second baffle 42 can be fixed to the outer wall of the inner cylinder 3 and extend towards the outer side of the inner cylinder 3 and can be embedded in the second groove. When installing the second baffle 42, the second baffle 42 can be fixed to the inner cylinder 3, and then the second baffle 42 can be slid in the second groove to determine a position of the second baffle 42 with respect to the middle cylinder 6. Finally, the second baffle 42 is fixed to the middle cylinder 6 by injecting a solder into the second groove.

According to FIGS. 4-6 and FIGS. 8-10, the heat transfer medium entered from the separation recess 61 first passes through the second area 521 on one side of the inner cylinder 3, and then passes through the second communication area 522 to reach the second area 521 on the other side of the inner cylinder 3, and flows out of the housing 2 through the air outlet 27.

It should be noted that FIG. 5 and FIG. 6 show a setting mode of the second baffle 42 when the first open end and second open end of the inner cylinder 3 are set respectively on both sides of the inner cylinder 3. FIG. 9 and FIG. 10 show a setting mode of the second baffle 42 when the first open end and second open end of the inner cylinder 3 are set on the same side as the open end of the outer cylinder 21.

Referring to FIG. 3-FIG. 9, the heat transfer medium in the third flow channel 53 is mostly liquid heat transfer medium. In FIG. 4, the liquid inlet 24 is set at the lower end of the inner cylinder 3 and the liquid outlet 25 is set at the upper end of the housing 2, which can slow down the flow speed of the liquid heat transfer medium to improve the heat transfer efficiency. In addition, the heat transfer medium in the first flow channel 51 and the second flow channel 52 is mostly gaseous. In FIG. 4, both the air inlet end 104 and the air outlet end 105 are set at the upper end of the housing 2, which can reduce the flow speed of the gaseous heat transfer medium to improve the heat transfer efficiency. In addition, in order to improve the heat transfer efficiency, the heat transfer mediums in the different flow channels that exchange heat with each other can have opposite flow directions. Exemplarily, in FIG. 8, the heat transfer medium in the third flow channel 53 flows in an opposite direction to the heat transfer medium in second flow channel 52.

Figure 11:
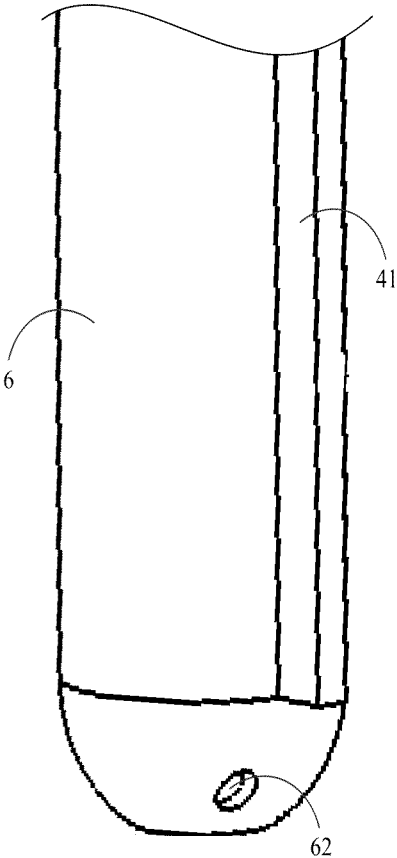
FIG. 11 is a partial diagram of a middle cylinder shown in FIG. 4.

FIG. 11 is a partial diagram of the middle cylinder 6 shown in FIG. 4. Referring to FIG. 4, lubricating oil of the compressor 71 will partially enter the circulation pipeline of the heat transfer medium. In an embodiment, in order to allow the lubricating oil to flow back into the compressor 71, the bottom of the middle cylinder 6 is provided with an oil return port 62.

Specifically, the mixture flowing out of the outlet end of the evaporator includes not only the heat transfer medium but also the lubricating oil. Since the first flow channel 51 is U-shaped, the lubricating oil will be deposited at the bottom of the U-shaped first flow channel 51 after entering the first flow channel or attached to the outer wall of the middle cylinder 6. In order to enable the lubricating oil to flow out of the air outlet 27 along with the heat transfer medium in the first flow channel 51, the oil return outlet 62 is arranged at the bottom of the middle cylinder 6. Since the pressure of the air inlet 26 is greater than that of the air outlet 27, the lubricating oil deposited at the bottom of the outer cylinder 21 enters the middle cylinder 6 through the oil return port 62 under the action of pressure difference. In addition, in an embodiment, the bottom of the middle cylinder 6 and the bottom of the outer cylinder 21 can be provided with an arc-shaped inner surface, and the center of the arc-shaped inner surface can be located in the middle cylinder 6 to facilitate the concentrated deposition of the lubricating oil.

It can be seen from the above that the heat transfer medium in the first flow channel 51 can exchange heat with the heat transfer medium in the second flow channel 52 in order to improve the heat transfer efficiency. If a buffer cylinder 8 is further arranged between the outer cylinder 21 and the middle cylinder 6, the heat transfer efficiency will be higher.

Figure 12:
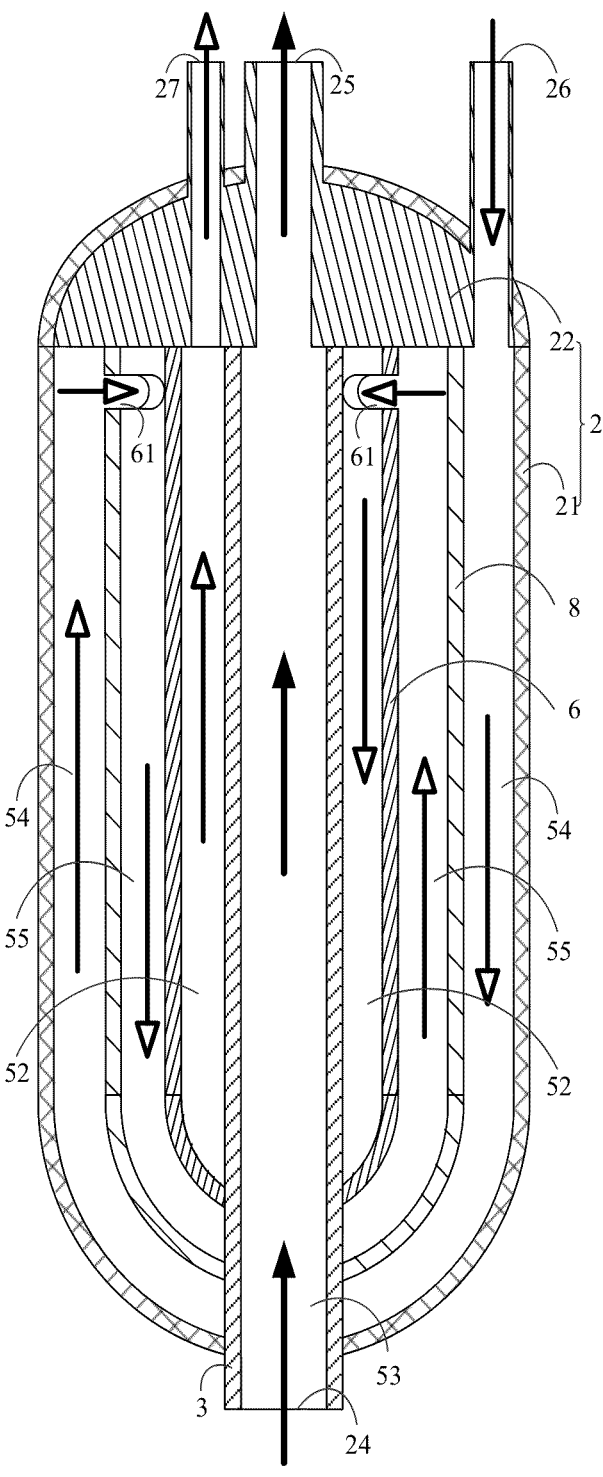
FIG. 12 is a longitudinal section view of yet another gas-liquid separator provided by an embodiment of the present application.

Exemplarily, FIG. 12 is a longitudinal section view of another gas-liquid separator provided by an embodiment of the present application. Referring to FIG. 12, a buffer cylinder 8 can further be arranged between the housing 2 and the middle cylinder 6, and the buffer cylinder 8 can be sleeved on the outside of the middle cylinder 6 and provided with a separation recess 61. A fourth flow channel 54 can be formed between the inner surface of the housing 2 and the outer surface of the buffer cylinder 8. The fourth flow channel 54 can be configured to communicate the air inlet 26 with the separation recess 61 arranged in the buffer cylinder 8. A fifth flow channel 55 can be formed between the inner surface of the buffer cylinder 8 and the outer surface of the middle cylinder 6. The fifth flow channel 55 can be configured to communicate the separation recess 61 arranged in the buffer cylinder 8 with the separation recess 61 arranged in the middle cylinder 6.

Of course, the number of the buffer cylinder 8 can be one as shown in FIG. 12, or the number of the buffer cylinder 8 can be multiple. When there are multiple buffer cylinders 8, the multiple buffer cylinders 8 can be sequentially nested from inside to outside, and a flow channel for flowing of the heat transfer medium can be formed between two adjacent buffer cylinders 8. The innermost buffer cylinder 8 is sleeved on the outside of the middle cylinder 6. The outermost buffer cylinder 8 is embedded in the housing 2, and a flow channel communicating with the air outlet can be formed between the outer surface of the outermost buffer cylinder 8 and the inner surface of the housing 2.

In the description, the terms "up" and "down" are used to describe the relative position relationship of structures in the attached drawings, only for the sake of clarity of description, and not to limit the scope of implementation of the present application. Changes or adjustments in the relative relationship shall also be regarded as the scope of implementation of the present application without substantive changes in technical content.

It is noted that: in the present application, unless expressly stated and limited otherwise, the first feature "above" or "below" the second feature may be a direct contact between the first and second features, or an indirect contact between the first and second features through an intermediate medium. Moreover, the first feature "on", "over" and "above" the second feature can mean that the first feature is directly above or diagonally above the second feature, or simply indicates that a horizontal height of the first feature is higher than that of the second feature. The first feature "under", "below", and "beneath" the second feature can mean that the first feature is directly below or diagonally below the second feature, or simply means that the horizontal height of the first feature is less than that of the second feature.

In addition, in the present application, unless expressly specified and limited otherwise, the terms "installation", "communication", "connection", "fixed" and other terms shall be understood broadly, for example, they may be fixed connection, or removable connection, or may be integrated; they can be directly connected, or indirectly connected through an intermediate medium, or they can be internal communication of two components or interaction between the two components. For ordinary technical persons skilled in the art, the specific meanings of the above terms in the present application can be understood according to a specific situation.

In the description of this specification, the description with reference to the terms "an embodiment", "some embodiments", "exemplary embodiments", "examples", "specific examples", or "some examples", etc. means that specific features, structures, materials, or characteristics described in combination with the embodiment or example are included in at least one embodiment or example of the present disclosure. In this specification, schematic representations of the above terms do not necessarily refer to the same embodiment or example. Further, the specific features, structures, materials or characteristics described may be combined in a suitable manner in any one or more embodiments or examples.

Finally, it should be noted that the above embodiments are used only to illustrate the technical solutions of the present application, and not to limit them; although the detailed description of the present application with reference to the foregoing embodiments, it should be understood by ordinary persons skilled in the art that they can modify the technical solutions described in the foregoing embodiments, or make equivalent replacements for some or all of the technical features therein; these modifications or replacements shall not make the essence of the corresponding technical solutions deviate from the scope of the technical solutions of the embodiments of the present application.

What is claimed is:

1. A gas-liquid separator for an air conditioning system of a vehicle, wherein the gas-liquid separator comprises:
   a housing having a liquid inlet, a liquid outlet, an air inlet and an air outlet;
   a middle cylinder arranged in the housing, wherein an upper end of the middle cylinder is provided with a separation recess, a first flow channel is formed between an inner surface of the housing and an outer surface of the middle cylinder, the first flow channel is configured to communicate the air inlet and the separation recess;

an inner cylinder at least partially accommodated in the middle cylinder, wherein a second flow channel is formed between at least part of an outer surface of the inner cylinder and an inner surface of the middle cylinder, the second flow channel is configured to communicate the separation recess and the air outlet; a third flow channel is formed in the inner cylinder, and the third flow channel is configured to communicate the liquid inlet with the liquid outlet.

2. The gas-liquid separator according to claim 1, wherein the middle cylinder is provided with an oil return port at bottom thereof;
   the air inlet and the air outlet are located on top of the housing; and
   the liquid outlet is arranged on the top of the housing.

3. The gas-liquid separator according to claim 1, wherein a buffer cylinder is arranged between the housing and the middle cylinder, the buffer cylinder is sleeved on an outside of the middle cylinder, and an upper end of the buffer cylinder is provided with the separation recess;
   a fourth flow channel is formed between the inner surface of the housing and an outer surface of the buffer cylinder, and the fourth flow channel is configured to communicate the air inlet with the separation recess arranged in the buffer cylinder;
   a fifth flow channel is formed between an inner surface of the buffer cylinder and the outer surface of the middle cylinder, the fifth flow channel is configured to communicate the separation recess arranged in the buffer cylinder with the separation recess arranged in the middle cylinder.

4. An air conditioning system for a vehicle, comprising a compressor, a condenser, an evaporator and the gas-liquid separator according to claim 1, an air inlet and an air outlet, and the liquid inlet is communicated with an outlet end of the condenser, the liquid outlet is communicated with an inlet end of the evaporator, and the air inlet is communicated with an outlet end of the evaporator, and the air outlet is communicated with an inlet end of the compressor.

5. The gas-liquid separator according to claim 1, wherein the middle cylinder is provided with an oil return port at bottom thereof, or
   the air inlet and the air outlet are located on top of the housing, or
   the liquid outlet is arranged on the top of the housing.

6. The gas-liquid separator according to claim 1, wherein the middle cylinder is provided with an oil return port at bottom thereof, and the air inlet and the air outlet are located on top of the housing, or
   the liquid outlet is arranged on the top of the housing.

7. The gas-liquid separator according to claim 1, wherein the middle cylinder is provided with an oil return port at bottom thereof, or
   the air inlet and the air outlet are located on top of the housing; and the liquid outlet is arranged on the top of the housing.

8. The gas-liquid separator according to claim 1, wherein the middle cylinder is provided with an oil return port at bottom thereof; and the liquid outlet is arranged on the top of the housing, or
   the air inlet and the air outlet are located on top of the housing.

9. The gas-liquid separator according to claim 1, wherein the housing comprises an outer cylinder and a cover plate, the outer cylinder and the middle cylinder have an open end on a same first side and a closed end on a same second side, the cover plate is configured to cover the open end of the outer cylinder and the open end of the middle cylinder, and the air inlet and the air outlet are arranged on the cover plate;

the outer cylinder, the middle cylinder and the cover plate between the outer cylinder and the middle cylinder are enclosed together to form the first flow channel, and the middle cylinder, the inner cylinder and the cover plate between the middle cylinder and the inner cylinder are enclosed together to form the second flow channel.

10. The gas-liquid separator according to claim 9, wherein the middle cylinder is provided with an oil return port at bottom thereof;

the air inlet and the air outlet are located on top of the housing; and the liquid outlet is arranged on the top of the housing.

11. The gas-liquid separator according to claim 9, wherein a buffer cylinder is arranged between the housing and the middle cylinder, the buffer cylinder is sleeved on an outside of the middle cylinder, and an upper end of the buffer cylinder is provided with the separation recess;

a fourth flow channel is formed between the inner surface of the housing and an outer surface of the buffer cylinder, and the fourth flow channel is configured to communicate the air inlet with the separation recess arranged in the buffer cylinder;

a fifth flow channel is formed between an inner surface of the buffer cylinder and the outer surface of the middle cylinder, the fifth flow channel is configured to communicate the separation recess arranged in the buffer cylinder with the separation recess arranged in the middle cylinder.

12. The gas-liquid separator according to claim 9, wherein the inner cylinder has a first open end and a second open end;

the first open end and the second open end are respectively arranged on opposite sides of the inner cylinder; the first open end is sequentially arranged through the closed end of the middle cylinder and the closed end of the outer cylinder, and is communicated with the liquid inlet; the second open end is arranged on the same first side as the open end of the outer cylinder, and the cover plate is further configured to cover the second open end; or, the first open end and the second open end are arranged on the same second side as the open end of the outer cylinder, and the cover plate is further configured to cover the first open end and the second open end, and the liquid inlet and the liquid outlet are arranged on the cover plate.

13. The gas-liquid separator according to claim 12, wherein the middle cylinder is provided with an oil return port at bottom thereof;

the air inlet and the air outlet are located on top of the housing; and the liquid outlet is arranged on the top of the housing.

14. The gas-liquid separator according to claim 12, wherein a buffer cylinder is arranged between the housing and the middle cylinder, the buffer cylinder is sleeved on an outside of the middle cylinder, and an upper end of the buffer cylinder is provided with the separation recess;

a fourth flow channel is formed between the inner surface of the housing and an outer surface of the buffer cylinder, and the fourth flow channel is configured to communicate the air inlet with the separation recess arranged in the buffer cylinder;

a fifth flow channel is formed between an inner surface of the buffer cylinder and the outer surface of the middle cylinder, the fifth flow channel is configured to communicate the separation recess arranged in the buffer cylinder with the separation recess arranged in the middle cylinder.

15. The gas-liquid separator according to claim 9, wherein a first baffle is arranged between the outer cylinder and the middle cylinder, the first baffle is accommodated at an upper part of the first flow channel, and is configured to divide the upper part of the first flow channel into two first areas, and the air inlet and the separation recess are communicated with the two first areas respectively, and undersides of the two first areas are intercommunicated.

16. The gas-liquid separator according to claim 15, wherein a second baffle is arranged between the middle cylinder and the inner cylinder, the second baffle is accommodated at an upper part of the second flow channel, and is configured to divide the upper part of the second flow channel into two second areas, the separation recess and the air outlet are communicated with the two second areas respectively, and undersides of the two second areas are intercommunicated.

17. The gas-liquid separator according to claim 15, wherein a buffer cylinder is arranged between the housing and the middle cylinder, the buffer cylinder is sleeved on an outside of the middle cylinder, and an upper end of the buffer cylinder is provided with the separation recess;

a fourth flow channel is formed between the inner surface of the housing and an outer surface of the buffer cylinder, and the fourth flow channel is configured to communicate the air inlet with the separation recess arranged in the buffer cylinder;

a fifth flow channel is formed between an inner surface of the buffer cylinder and the outer surface of the middle cylinder, the fifth flow channel is configured to communicate the separation recess arranged in the buffer cylinder with the separation recess arranged in the middle cylinder.

18. The gas-liquid separator according to claim 15, wherein an inner wall of the outer cylinder is provided with a first groove, and the first baffle is fixed to an outer wall of the middle cylinder, extends towards an outer side of the middle cylinder, and is embedded in the first groove.

19. The gas-liquid separator according to claim 18, wherein an inner wall of the middle cylinder is provided with a second groove, the second baffle is fixed to an outer wall of the inner cylinder, extends towards an outer side of the inner cylinder, and is embedded in the second groove.

20. The gas-liquid separator according to claim 18, wherein a buffer cylinder is arranged between the housing and the middle cylinder, the buffer cylinder is sleeved on an outside of the middle cylinder, and an upper end of the buffer cylinder is provided with the separation recess;

a fourth flow channel is formed between the inner surface of the housing and an outer surface of the buffer cylinder, and the fourth flow channel is configured to communicate the air inlet with the separation recess arranged in the buffer cylinder;

a fifth flow channel is formed between an inner surface of the buffer cylinder and the outer surface of the middle cylinder, the fifth flow channel is configured to communicate the separation recess arranged in the buffer cylinder with the separation recess arranged in the middle cylinder.

* * * * *